A. HENSLEE.
PLANTER.
APPLICATION FILED JUNE 3, 1911.
1,031,338.
Patented July 2, 1912.
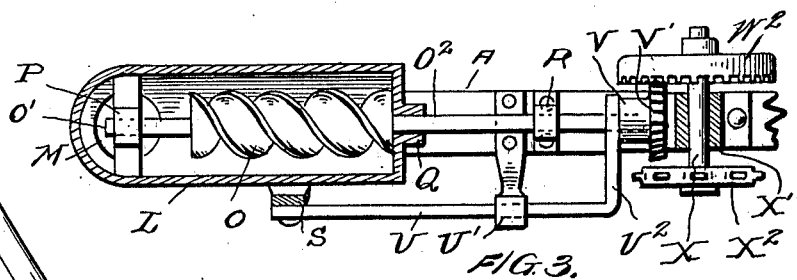
FIG. 3.
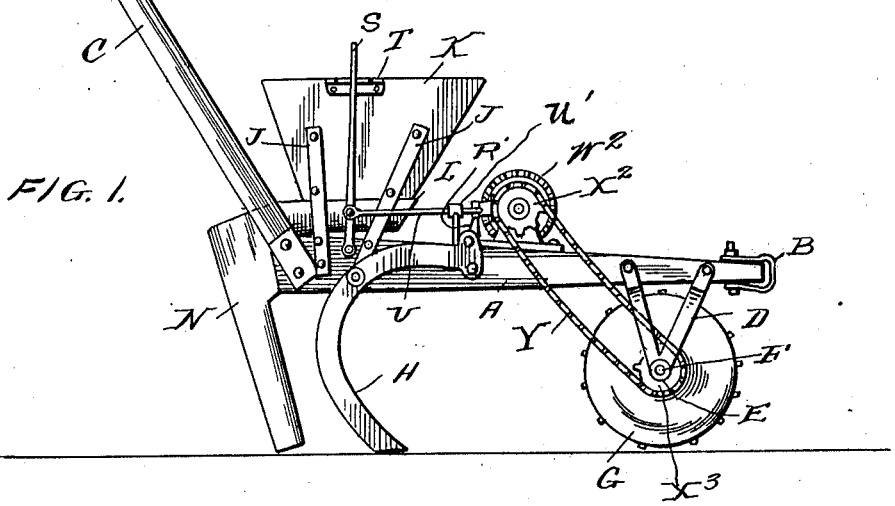
FIG. 1.
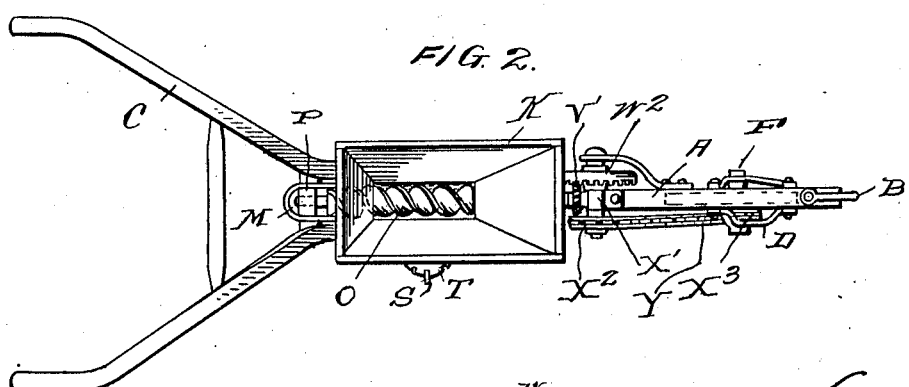
FIG. 2.
FIG. 4.
WITNESSES
INVENTOR
Arthur Henslee
by Wm. N. Moore
Attorney

UNITED STATES PATENT OFFICE.

ARTHUR HENSLEE, OF VILLA RICA, GEORGIA.

PLANTER.

1,031,338.  Specification of Letters Patent.  Patented July 2, 1912.

Application filed June 3, 1911. Serial No. 631,157.

*To all whom it may concern:*

Be it known that I, ARTHUR HENSLEE, a citizen of the United States, residing at Villa Rica, in the county of Carroll and State of Georgia, have invented certain new and useful Improvements in Planters, of which the following is a specification.

My invention relates to improvements in planters and the main object of my invention is the provision of a planter which will be capable of sowing seed or grain of different sizes and kinds and which can be regulated or adjusted to plant or sow in a slow or rapid manner according to the circumstances and requirements.

Another object of my invention is the provision of a planter which can be adapted to any character of seed or grain and which can be instantly adjusted to the desired purpose and which will possess the necessary requirements of simplicity, durability and inexpensiveness of production.

To attain the desired objects my invention consists of a planter embodying novel features of construction, combination and arrangement of parts for service substantially as disclosed herein.

Figure 1 represents a side view of a planter constructed in accordance with and embodying my invention. Fig. 2 represents a top plan view of the complete planter. Fig. 3 represents a view partly in plan and partly in horizontal section of the seed planting and operating mechanism. Fig. 4 represents an elevation of the double gear operating disk or wheel.

In the drawings: the letter A designates the beam provided with the clevis B, and to the rear end of the beam is secured the handles C, and adjacent the front end of said beam are secured the hangers D, in which are provided the bearings E for the axle F, upon which is mounted the ground wheel G. Secured to beam in rear of the wheel G are the furrow openers H. These parts of the planter are of the usual construction and formed on and rising from the beam on each side are the pairs of standards J, which support the seed or grain feed hopper K, to the open lower end of which is secured the longitudinally disposed tubular trough L, from the open outer end M of which leads the seed or grain spout N, which directs and delivers the seed or grain into the furrow. From this construction it will be apparent that the seed or grain is fed from the trough into the spout and from there planted and to properly effect the planting I employ the screw O having the short stud O', mounted to revolve and slide in the bearing P, and the long shaft $O^2$, mounted to slide and revolve in the bearing Q of the feed trough and the bearing R, provided in the bracket R', secured upon the beam, and to effect the sliding or shifting of the screw in the feed trough, for a purpose which will presently appear, I provide the hand lever S, pivoted to the beam at its lower end and having its upper end retained by the rack T, the rod U, guided in the arm U', and having its bent end $U^2$, connected to the shaft $O^2$. Adjacent said bent end and secured to the shaft is the hub V, carrying the bevel gear wheel V'. This bevel gear wheel V' is adapted to be engaged by reason of its sliding or shifting movement with either the outer set W or the inner set W' of teeth on the wheel or disk $W^2$, which is on the short transverse shaft X, mounted in the bearing X', and on the other end of said shaft is the sprocket wheel $X^2$, over which and the sprocket wheel $X^3$, passes the driving chain Y, the sprocket wheel $X^3$ being mounted on the axle of the ground wheel.

In operation the hopper is supplied with seed or grain and the planter drawn over the field, the driving chain imparting motion to the short shaft, which revolves the double-toothed wheel, which turns the shaft carrying the screw, the action of the screw carrying the seed or grain to the discharge opening of the feed trough and thence through the spout to the furrow. The screw will revolve at a determined rate of speed when the bevel gear thereon is engaged with the inner set of teeth of the disk and at another speed when engaged with the outer set of teeth of the disk and the shift from one set of teeth to the other is accomplished by means of the hand lever and the rod which is connected to the shaft of the screw.

It will be apparent that my planter may be used for any character of seed or grain; also that a positive feed and one capable of regulation is provided and that generally the planter is thoroughly efficient and practical in every respect.

I claim:

1. A planter, comprising a beam, handles, a ground wheel secured to the beam, a hopper, a feed trough, a discharge spout, a shaft mounted in the hopper, a screw mounted on said shaft, a rod connected to the shaft at one end and having its other end pivotally secured to a lever secured upon the hopper, a pinion mounted upon the front end of the said shaft and above the beam, a countershaft supported above the beam, a disk mounted upon one end of the shaft having concentric series of gear teeth meshing with said pinion, a sprocket mounted upon the other end of the countershaft, a sprocket mounted upon the axle of the ground wheel, and a sprocket chain connecting said sprocket wheels.

2. A planter, consisting of the beam, handles, and ground wheel, the hopper, the feed trough, the discharge spout, the shaft mounted in the hopper and carrying a screw, and means for imparting a sliding and revolving action to the screw, said means consisting of a rod connected to the shaft of the screw, a lever for shifting the rod, a pinion on the shaft, a countershaft, a disk provided with concentric series of gear teeth mounted upon the countershaft and meshing with the pinion, a sprocket carried upon the countershaft, a sprocket carried upon the axle of the ground wheel, and a sprocket chain connecting said sprockets.

3. In a planter, the combination with the beam, the hopper, the feed trough and the discharge spout, the sliding shaft mounted in the hopper, the screw on said shaft, the gear wheel on one end of the shaft, the rod and lever for shifting the shaft and gear wheel, the countershaft, the double-toothed disk upon the counter shaft for engaging the gear wheel mounted above the beam, a sprocket carried upon the countershaft, a sprocket carried upon the ground wheel axle, and a sprocket chain connecting said sprockets.

4. In a planter, the combination with a beam, hangers depending therefrom, a ground wheel carried thereby, a sprocket wheel on the axle thereof, a pair of standards rising from the beam, a hopper supported thereby, a longitudinally disposed tubular trough secured to the lower end thereof, a spout leading therefrom, a screw having a short stud slidably and revolubly mounted in a bearing in the trough, a long shaft slidably and revolubly mounted in a bearing in the trough, a pinion carried by the long shaft, a transverse shaft, a gear thereon meshing with the pinion, said gear having its teeth arranged in concentric series, a sprocket on the transverse shaft, a sprocket chain connecting said sprocket with the sprocket on the axle, and means for shifting the pinion to engage either series of concentric teeth on said gear wheel.

5. In a planter, the combination with a beam, hangers depending therefrom, a ground wheel carried thereby, a sprocket wheel on the axle thereof, a pair of standards rising from the beam, a hopper supported thereby, a longitudinally disposed tubular trough secured to the lower end thereof, a spout leading therefrom, a screw having a short stud slidably and revolubly mounted in a bearing in the trough, a long shaft slidably and revolubly mounted in a bearing in the trough, a pinion carried by the long shaft, a transverse shaft, a gear thereon meshing with the pinion, said gear having its teeth arranged in concentric series, a sprocket on the transverse shaft, connection means between said sprocket and the sprocket upon the ground wheel axle, and means for shifting the pinion to engage any desired series of teeth on the gear wheel, said means comprising a lever pivoted upon the hopper and beam, and a cranked rod pivoted at one end to the lever and having its other end connected to the long shaft adjacent the pinion thereon.

In testimony whereof I affix my signature in presence of two witnesses.

ARTHUR HENSLEE.

Witnesses:
W. B. EMBRY,
I. G. HENSLEE.

Copies of this patent may be obtained for five cents each, by addressing the "Commissioner of Patents, Washington, D. C."